US009000107B2

(12) United States Patent
Qin et al.

(10) Patent No.: US 9,000,107 B2
(45) Date of Patent: Apr. 7, 2015

(54) PROCESS FOR PRODUCING POLYDIENES

(75) Inventors: Zengquan Qin, Copley, OH (US); Jason T. Poulton, Akron, OH (US)

(73) Assignee: Bridgestone Corporation, Tokyo (JP)

(*) Notice: Subject to any disclaimer, the term of this patent is extended or adjusted under 35 U.S.C. 154(b) by 573 days.

(21) Appl. No.: 13/362,718

(22) Filed: Jan. 31, 2012

(65) Prior Publication Data

US 2012/0196995 A1  Aug. 2, 2012

Related U.S. Application Data

(60) Provisional application No. 61/437,709, filed on Jan. 31, 2011.

(51) Int. Cl.
*C08F 4/54* (2006.01)
*C08F 2/02* (2006.01)
*C08F 2/06* (2006.01)
*C08F 36/04* (2006.01)
*C08F 136/06* (2006.01)

(52) U.S. Cl.
CPC .............. *C08F 36/04* (2013.01); *Y10S 526/902* (2013.01)

(58) Field of Classification Search
CPC ................................ C08F 4/545; C08F 36/04
USPC ........................ 526/141, 147, 164, 340.4, 902
See application file for complete search history.

(56) References Cited

U.S. PATENT DOCUMENTS

| | | | |
|---|---|---|---|
| 3,165,503 A * | 1/1965 | Horne, Jr. et al. | 526/141 |
| 3,167,571 A | 1/1965 | Charleston et al. | |
| 3,297,667 A | 1/1967 | Dohlen et al. | |
| 4,242,232 A | 12/1980 | Sylvester et al. | |
| 4,260,707 A | 4/1981 | Sylvester et al. | |
| 4,461,883 A | 7/1984 | Takeuchi et al. | |
| 4,533,711 A | 8/1985 | Takeuchi et al. | |
| 4,575,538 A | 3/1986 | Hsieh et al. | |
| 4,663,405 A | 5/1987 | Throckmorton | |
| 4,696,984 A | 9/1987 | Carbonaro et al. | |
| 4,710,553 A | 12/1987 | Carbonaro et al. | |
| 4,736,001 A | 4/1988 | Carbonaro et al. | |
| 5,506,865 A | 4/1996 | Weaver, Jr. | |
| 5,565,602 A | 10/1996 | Matson et al. | |
| 6,255,416 B1 | 7/2001 | Sone et al. | |
| 6,391,990 B1 | 5/2002 | Ishino et al. | |
| 6,437,205 B1 | 8/2002 | Miller et al. | |
| 6,482,930 B1 | 11/2002 | Kwag et al. | |
| 6,521,726 B1 | 2/2003 | Kimura et al. | |
| 6,596,825 B1 | 7/2003 | Miller | |
| 6,632,895 B1 | 10/2003 | Melchiors et al. | |
| 6,727,330 B1 | 4/2004 | DeDecker et al. | |
| 6,841,703 B2 | 1/2005 | Nesvadba et al. | |
| 6,887,956 B2 | 5/2005 | van der Huizen et al. | |
| 6,897,270 B2 | 5/2005 | Ozawa et al. | |
| 7,081,504 B2 * | 7/2006 | Rachita et al. | 526/141 |
| 7,094,849 B2 | 8/2006 | Luo et al. | |
| 7,288,611 B2 | 10/2007 | Jiang et al. | |
| 7,396,889 B2 | 7/2008 | Robert | |
| 7,928,159 B2 | 4/2011 | Yan | |
| 8,017,695 B2 | 9/2011 | Luo et al. | |
| 8,153,723 B2 | 4/2012 | Nakamura et al. | |
| 2010/0105827 A1 | 4/2010 | Tanaka et al. | |
| 2010/0216956 A1 * | 8/2010 | Luo et al. | 526/141 |

FOREIGN PATENT DOCUMENTS

WO    WO2004074333    9/2004

* cited by examiner

*Primary Examiner* — Fred M Teskin
(74) *Attorney, Agent, or Firm* — Meredith E. Hooker; Arthur M. Reginelli

(57) ABSTRACT

A process for preparing a polydiene, the process comprising the step of: polymerizing conjugated diene monomer in the presence of a (hydrocarbyloxyhydrocarbyl)amine, where said step of polymerizing employs a lanthanide-based catalyst system.

24 Claims, No Drawings

PROCESS FOR PRODUCING POLYDIENES

This application gains the benefit of U.S. Provisional Application Ser. No. 61/437,709 filed on Jan. 31, 2011, which is incorporated herein by reference.

FIELD OF THE INVENTION

One or more embodiments of the present invention are directed toward a process for producing polydienes, the process comprising polymerizing conjugated diene monomer with a lanthanide-based catalyst system in the presence of a (hydrocarbyloxyhydrocarbyl)amine.

BACKGROUND OF THE INVENTION

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Despite its many advantages, bulk polymerization requires very careful temperature control, and there is also the need for strong and elaborate stirring equipment since the viscosity of the polymerization mixture can become very high. In the absence of added diluent, the high cement viscosity and exotherm effects can make temperature control very difficult. Consequently, local hot spots may occur, resulting in degradation, gelation, and/or discoloration of the polymer product. In the extreme case, uncontrolled acceleration of the polymerization rate can lead to disastrous "runaway" reactions. To facilitate the temperature control during bulk polymerization, it is desirable that a catalyst gives a reaction rate that is sufficiently fast for economical reasons but is slow enough to allow for the removal of the heat from the polymerization exotherm in order to ensure the process safety.

Lanthanide-based catalyst systems that comprise a lanthanide compound, an alkylating agent, and a halogen source are known to be useful for producing conjugated diene polymers having high cis-1,4-linkage contents. Nevertheless, when applied to bulk polymerization of conjugated dienes, lanthanide-based catalyst systems, especially those comprising an aluminoxane compound as a catalyst component, often give excessively fast polymerization rates, which makes it very difficult to control the temperature and compromises the process safety. Therefore, it is desirable to develop a method of moderating the bulk polymerization of conjugated dienes catalyzed by lanthanide-based catalysts.

It is also known that cis-1,4-polydienes having higher cis-1,4-linkage content exhibit the increased ability to undergo strain-induced crystallization and thus give superior physical properties such as higher tensile strength and higher abrasion resistance. Therefore, it is desirable to develop a method for producing cis-1,4-polydienes having higher cis-1,4-linkage content in both solution and bulk polymerization systems.

SUMMARY OF THE INVENTION

One or more embodiments of the present invention provide a process for preparing a polydiene, the process comprising the step of: polymerizing conjugated diene monomer in the presence of a (hydrocarbyloxyhydrocarbyl)amine, where said step of polymerizing employs a lanthanide-based catalyst system.

Other embodiments provide a process for preparing a polydiene, the process comprising the step of: polymerizing conjugated diene monomer with a lanthanide-based catalyst system including the combination of or reaction product of (a) a lanthanide compound, (b) an alkylating agent, (c) a halogen-containing compound, and (d) a (hydrocarbyloxyhydrocarbyl)amine.

Other embodiments provide a process for preparing a polydiene, the process comprising the step of: introducing (a) conjugated diene monomer, (b) a lanthanide compound, (c) an alkylating agent, (d) a halogen-containing compound, and (e) a (hydrocarbyloxyhydrocarbyl)amine.

DETAILED DESCRIPTION OF ILLUSTRATIVE EMBODIMENTS

According to one or more embodiments of the present invention, polydienes are produced by polymerizing conjugated diene monomer with a lanthanide-based catalyst system in the presence of a (hydrocarbyloxyhydrocarbyl)amine. The presence of a (hydrocarbyloxyhydrocarbyl)amine has been found to offer a number of advantages. Where a lanthanide-based catalyst system is designed to yield cis-1,4-polydienes, the presence of a (hydrocarbyloxyhydrocarbyl) amine advantageously increases the cis-1,4-linkage content of the resulting polydiene as compared to polydienes produced in the absence of a (hydrocarbyloxyhydrocarbyl) amine. The presence of a (hydrocarbyloxyhydrocarbyl) amine is particularly advantageous in bulk polymerization systems because it has been discovered that the presence of a (hydrocarbyloxyhydrocarbyl)amine modulates the polymerization rate and thereby facilitates temperature control and reduces the risk of runaway reactions in bulk polymerization.

Monomer

In one or more embodiments, examples of conjugated diene monomer that can be polymerized according to the present invention include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Catalyst System

Practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e. a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

In one or more embodiments, polydienes are produced according to the present invention by introducing (a) conjugated diene monomer, (b) a lanthanide compound, (c) an alkylating agent (d) a halogen-containing compound, and (e) a (hydrocarbyloxyhydrocarbyl)amine. In certain embodiments, the (hydrocarbyloxyhydrocarbyl)amine can be combined with the other catalyst components to form a catalyst system that includes the combination of or reaction product of a lanthanide compound, an alkylating agent, a halogen-containing compound, and a (hydrocarbyloxyhydrocarbyl) amine.

Lanthanide Compound

As mentioned above, the catalyst systems employed in the present invention can include a lanthanide-containing compound, which may also be referred to as lanthanide compound. Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis (p-nonylphenyl)phosphate, neodymium butyl (2-ethylhexyl) phosphate, neodymium (1-methylheptyl) (2-ethylhexyl) phosphate, and neodymium (2-ethylhexyl)(p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl)phosphonate, neodymium (2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl)(1-methylheptyl)phosphonate, neodymium (2-ethylhexyl)(2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl)butylphosphonate, neodymium (1-methylheptyl)(2-ethylhexyl)phosphonate, neodymium (2-ethylhexyl)(1-methylheptyl) phosphonate, neodymium (2-ethylhexyl)(p-nonylphenyl) phosphonate, and neodymium (p-nonylphenyl)(2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl) phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium (1-methylheptyl)(2-ethylhexyl)phosphinate, and neodymium (2-ethylhexyl)(p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can also serve as the halogen-containing compound.

The term organolanthanide compound may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Alkylating Agent

As mentioned above, the catalyst systems employed in the present invention can include an alkylating agent. Various alkylating agents, or mixtures thereof, can be used. In one or more embodiments, alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile halogen atom, the alkylating agent may also serve as the halogen-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

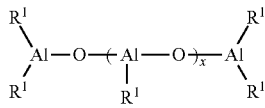

and oligomeric cyclic aluminoxanes that can be represented by the general formula:

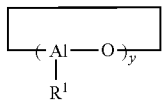

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 5-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, are employed in combination. U.S. Ser. No. 60/877,535, which is incorporated herein by reference, provides other examples where aluminoxanes and organoaluminum compounds are employed in combination.

The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a mono-valent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, silicon, sulfur, and phosphorus atom.

Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a mono-valent organic group, with the proviso that the group is attached to the magnesium atom via a carbon atom, and X is a hydrogen atom, a halogen atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, boron, silicon, sulfur, and phosphorus atoms. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Halogen Source

As mentioned above, the catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Various halogen-containing compounds, or mixtures thereof, that contain one or more labile halogen atoms can be employed. Examples of halogen atoms include, but are not limited to, fluorine, chlorine, bromine, and iodine. A combination of two or more halogen-containing compounds having different halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include, but are not limited to, elemental halogens, mixed halogens, hydrogen halides, organic halides, inorganic halides, metallic halides, organometallic halides, and mixtures thereof.

Elemental halogens include fluorine, chlorine, bromine, and iodine. Mixed halogens include iodine monochloride, iodine monobromide, iodine trichloride, and iodine pentafluoride.

Hydrogen halides include hydrogen fluoride, hydrogen chloride, hydrogen bromide, and hydrogen iodide.

Organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In yet other embodiments, a compound containing a non-coordinating anion, or a non-coordinating anion precursor, i.e., a compound that can undergo a chemical reaction to form a non-coordinating anion, may be employed in lieu of a halogen-containing compound. Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

(Hydrocarbyloxyhydrocarbyl)Amine Compounds

In one or more embodiments, (hydrocarbyloxyhydrocarbyl)amines include secondary amines that include at least 1 ether group. As those skilled in the art appreciate, ether groups may be defined by the formula $R^1$—O—$R^2$—, where $R^1$ is a hydrocarbyl group and $R^2$ is a hydrocarbylene group. The term hydrocarbyl group, as employed herein, includes substituted hydrocarbyl groups. Likewise, the term hydrocarbylene group, as used herein, refers to substituted hydrocarbylene groups. As those skilled in the art appreciate, substituted hydrocarbyl or hydrocarbylene groups include those groups wherein a hydrogen atom has been replaced by a hydrocarbyl group. The hydrocarbyl and hydrocarbylene groups may contain heteroatoms such as, but not limited to, nitrogen, oxygen, silicon, tin, sulfur, boron, and phosphorus atoms. Examples of hydrocarbyl groups or substituted hydrocarbyl groups include, but are not limited to, alkyl, cycloalkyl, substituted cycloalkyl, alkenyl, cycloalkenyl, aryl, substituted aryl groups and heterocyclic groups. Examples of hydrocarbylene groups or substituted hydrocarbylene groups include, but are not limited to, alkylene groups, cycloalkylene groups, substituted cycloalkylene groups, alkynelene groups, cycloalkynelene groups, arylene groups, and substituted arylene groups.

Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups.

Exemplary cycloalkyl groups include cyclopropyl, cyclobutyl, cyclopentyl, cyclohexyl, 2-methylcyclohexyl, 2-t-butylcyclohexyl and 4-t-butylcyclohexyl groups.

Exemplary aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a mono-valent organic group such as a hydrocarbyl group.

Exemplary substituted phenyl groups include 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl (also called mesityl) groups.

Exemplary bicyclic or polycyclic aryl groups include 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathiinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl groups.

Exemplary heterocyclic groups include 2-thienyl, 3-thienyl, 2-furyl, 3-furyl, N-methyl-2-pyrrolyl, N-methyl-3-pyrrolyl, N-methyl-2-imidazolyl, 1-pyrazolyl, N-methyl-3-pyrazolyl, N-methyl-4-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, 2-triazinyl, morpholinyl, thiomorpholinyl, piperidinyl, piperazinyl, pyrrolidinyl, pyrrolinyl, imidazolidinyl, and imidazolinyl groups.

In one or more embodiments, (hydrocarbyloxyhydrocarbyl)amines may be defined by the formula

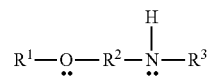

where $R^1$ is a hydrocarbyl group, $R^2$ is a hydrocarbylene group, and $R^3$ is a hydrocarbyl group or a group defined by the formula $R^1$—O—$R^2$—. In particular embodiments, each of $R^1$ and $R^3$ are alkyl or aryl groups, and $R^2$ is an alkylene group. Where $R^2$ includes 2 or more carbon atoms, the alkoxy group (i.e., $R^1$—O—) may be positioned on any of the $R^2$ carbon atoms. In particular embodiments, the alkoxy group is positioned on the α carbon (i.e., the carbon atom bonded to the nitrogen), or in other embodiments, the alkoxy group may be positioned on the ω carbon (i.e., the carbon atom furthest from the nitrogen).

In particular embodiments, the (hydrocarbyloxyhydrocarbyl)amines may be defined by the formula

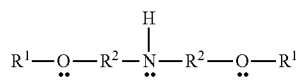

where each $R^1$ is independently a monovalent organic group and each $R^2$ is independently a divalent organic group. In particular embodiments, each $R^1$ is alkyl or aryl groups, and $R^2$ is an alkylene group.

Types of (hydrocarbyloxyhydrocarbyl)amines include bis(hydrocarbyloxyhydrocarbyl)amines and (hydrocarbyloxyhydrocarbyl)(hydrocarbyl)amines.

General types of bis(hydrocarbyloxyhydrocarbyl)amines include bis(alkoxy alkyl)amines, bis(aryloxyalkyl)amines, and (alkoxyalkyl)(aryloxyalkyl)amines.

General types of (hydrocarbyloxyhydrocarbyl)(hydrocarbyl)amines include (alkoxyalkyl)(alkyl)amines, (alkoxyalkyl)(aryl)amines, (aryloxyalkyl)(alkyl)amines, and (aryloxyalkyl)(aryl)amines.

Specific examples of bis(alkoxyalkyl)amines include bis(methoxymethyl)amine, bis(ethoxymethyl)amine, bis(propoxymethyl)amine, bis(butoxymethyl)amine, bis(pentoxymethyl)amine, bis(2-methoxyethyl)amine, bis(1-ethoxyethyl)amine, bis(2-propoxyethyl)amine, bis(1-butoxyethyl)amine, bis(2-pentoxyethyl)amine bis(1-methoxypropyl)amine, bis(2-ethoxypropyl)amine, bis(3-propoxypropyl)amine, bis(1-butoxypropyl)amine, bis(2-pentoxypropyl)amine, bis(1-methoxybutyl)amine, bis(2-ethoxybutyl)amine, bis(3-propoxybutyl)amine, bis(4-butoxybutyl)amine, and bis(1-pentoxybutyl)amine.

Specific examples of bis(aryloxyalkyl)amines include bis(phenoxymethyl)amine, bis(2-phenoxyethyl)amines bis(3-phenoxypropyl)amine, bis(4-phenoxybutyl)amine and bis(5-phenoxypentyl)amine.

Specific examples of (alkyoxyalkyl)(aryloxyalkyl)amines include (methoxymethyl)(phenoxymethyl)amine, (ethoxyethyl)(phenoxyethyl)amine, (propoxymethyl)(3-phenoxypropyl)amine, (butoxymethyl)(4-phenoxybutyl)amine, and (pentoxymethyl)(5-phenoxypentyl)amine.

Specific examples of (alkoxyalkyl)(alkyl)amines include (methoxymethyl)(methyl)amine, (ethoxymethyl)(methyl)amine, (propoxymethyl)(methyl)amine, (butoxymethyl)(methyl)amine, (pentoxymethyl)(methyl)amine, (1-methoxyethyl)(ethyl)amine, (2-ethoxyethyl) (ethyl)amine, (1-propoxyethyl)(ethyl)amine, (2-butoxyethyl)(ethyl)amine, (1-pentoxyethyl)(ethyl)amine, (1-methoxypropyl)(propyl)amine, (2-ethoxypropyl)(propyl)amine, (3-propoxypropyl)(propyl)amine, (1-butoxypropyl)(propyl)amine, (2-pentoxypropyl)(propyl)amine, (1-methoxybutyl)(butyl)amine, (2-ethoxybutyl)(butyl)amine, (3-propoxybutyl)amine, (4-butoxybutyl)(butyl)amine, and (1-pentoxybutyl)(butyl)amine.

Specific examples of (alkoxyalkyl)(aryl)amines include (methoxymethyl)(phenyl)amine, (ethoxymethyl)(phenyl)amine, (propoxymethyl)(phenyl)amine, (butoxymethyl)(phenyl)amine, and (pentoxymethyl)(phenyl)amine.

Specific examples of (aryloxyalkyl)(alkyl)amines include (phenoxymethyl)(methyl)amine, (2-phenoxyethyl)(methyl)amine, (3-phenoxypropyl)(methyl)amine, (4-phenoxybutyl)(methyl)amine, (5-phenoxypentyl)(methyl)amine, (4-phenoxymethyl)(ethyl)amine, (2-phenoxyethyl)(ethyl)amine, (1-phenoxypropyl)(ethyl)amine, (2-phenoxybutyl)(ethyl)amine, (5-phenoxypentyl)(ethyl)amine, (phenoxymethyl)(propyl)amine, (2-phenoxyethyl)(propyl)amine, (3-phenoxypropyl)(propyl)amine, (4-phenoxybutyl)(propyl)amine, and (5-phenoxypentyl)(propyl)amine.

Specific examples of (aryloxyalkyl)(aryl)amines include (phenoxymethyl)(phenyl)amine, (2-phenoxyethyl)(phenyl)amine, (3-phenoxypropyl)(phenyl)amine, (4-phenoxybutyl)(phenyl)amine, and (5-phenoxypentyl)(phenyl)amine.

Formation of Catalyst

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination or reaction product of the lanthanide compound, alkylating agent, and halogen-containing compound is conventionally referred to as a catalyst system or catalyst composition. The (hydrocarbyloxyhydrocarbyl)amine, as used herein, may be referred to as a component of that system or as a modifier to that system. In this respect, reference to catalyst ingredients refers to the lanthanide compound, the alkylating agent, the halogen-containing compound, and the (hydrocarbyloxyhydrocarbyl)amine. The term modified catalyst composition or modified catalyst system may be employed to encompass a simple mixture of the ingredients, a complex of the various ingredients that is caused by physical or chemical forces of attraction, a chemical reaction product of the ingredients, or a combination of the foregoing.

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide compound is best described in terms of the ratio of the moles of halogen atoms in the halogen-containing compound to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In relevant embodiments, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

In one or more embodiments, the molar ratio of the (hydrocarbyloxyhydrocarbyl)amine to the lanthanide compound (amine/Ln) can be varied from 0.1:1 to about 500:1, in other embodiments from about 0.5:1 to about 200:1, and in other embodiments from about 1:1 to about 100:1.

The lanthanide-based catalyst can be formed by employing several techniques. For example, the catalyst may be formed by adding the catalyst components directly to the monomer to be polymerized. In this respect, the catalyst components including the (hydrocarbyloxyhydrocarbyl)amine may be added either in a stepwise or simultaneous manner. The order in which the (hydrocarbyloxyhydrocarbyl)amine is added relative to the other catalyst ingredients is not critical. In one embodiment, when the catalyst ingredients are added in a stepwise manner, the (hydrocarbyloxyhydrocarbyl)amine can be added first, followed by the alkylating agent, followed by the lanthanide compound, and ultimately followed by the halogen-containing compound. In other embodiments, the (hydrocarbyloxyhydrocarbyl)amine is added after the other catalyst ingredients. The addition of the catalyst components directly and individually to the monomer to be polymerized may be referred to as an in situ formation of the catalyst system.

In other embodiments, the catalyst may be preformed. That is, the catalyst ingredients including the (hydrocarbyloxyhydrocarbyl)amine may be introduced and pre-mixed outside of the monomer to be polymerized. In particular embodiments, the preformation of the catalyst may occur either in the absence of any monomer or in the presence of a small amount of at least one conjugated diene monomer at an appropriate temperature, which is generally from about −20° C. to about 80° C. Mixtures of conjugated diene monomers may also be used. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting preformed catalyst composition can be aged, if desired, prior to being added to the monomer that is to be polymerized.

In other embodiments, the catalyst may be formed by using a two-stage procedure. The first stage can involve combining the lanthanide compound with the alkylating agent either in the absence of any monomer or in the presence of a small amount of at least one conjugated diene monomer at an appropriate temperature (e.g., −20° C. to about 80° C.). The amount of monomer employed in preparing this first-stage mixture may be similar to that set forth above for preforming the catalyst. In the second stage, the mixture prepared in the first stage, the (hydrocarbyloxyhydrocarbyl)amine, and the halogen-containing compound can be added in either a stepwise or simultaneous manner to the monomer that is to be polymerized. In one embodiment, the (hydrocarbyloxyhydrocarbyl)amine can be added first, followed by the mixture prepared in the first stage, and then followed by the halogen-containing compound.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

Polydiene Production

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

In one or more embodiments, the polymerization of conjugated diene monomer according to this invention may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Publication No. 2005/0197474 A1, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Polymer Functionalization

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Ser. No. 11/640,711, which issued as U.S. Pat. No. 7,879,952 on Feb. 1, 2011, hydrobenzamide compounds as disclosed in U.S. Ser. No. 11/710,713, which issued as U.S. Pat. No. 7,671,138, on Mar. 2, 2010, nitro compounds as disclosed in U.S. Ser. No. 11/710,845, which issued as U.S. Pat. No. 7,732,534, on Jun. 8, 2010, and protected oxime compounds as disclosed in U.S. Ser. No. 60/875,484, which was filed non-provisionally as Ser. No. 11/955,437 and ultimately issued as U.S. Pat. No. 8,088,868 on Jan. 3, 2012, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 moles, in other embodiments from about 5 to about 150 moles, and in other embodiments from about 10 to about 100 moles per mole of the lanthanide compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in co-pending U.S. Ser. No. 11/890,590, filed on Aug. 7, 2007, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Quenching and Deactivation

Once a functionalizing agent has been introduced to the polymerization mixture and a desired reaction time has been provided, a quenching agent can be added to the polymerization mixture in order to inactivate any residual reactive polymer chains and the catalyst or catalyst components. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in copending U.S. Ser. No. 11/890,591, filed on Aug. 7, 2007, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture Polymer Recovery Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Polymer Characteristics

The cis-1,4-polydienes (e.g., cis-1,4-polybutadiene) produced by one or more embodiments of the process of this invention may advantageously have a cis-1,4-linkage content in excess of 96%, in other embodiments in excess of 97%, in other embodiments in excess of 98%, and in other embodiments in excess of 99%.

The cis-1,4-polydienes (e.g., cis-1,4-polybutadiene) produced by one or more embodiments of the process of this invention may advantageously have a molecular weight distribution of less than 3.0, in other embodiments less than 2.5, and in other embodiments less than 2.0.

INDUSTRIAL APPLICABILITY

The polydienes of this invention are particularly useful in preparing rubber compositions that can be used to manufacture tire components. Rubber compounding techniques and the additives employed therein are generally disclosed in *The Compounding and Vulcanization of Rubber*, in *Rubber Technology* (2nd Ed. 1973).

The rubber compositions can be prepared by using the polydienes alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 m$^2$/g and in other embodiments at least 35 m$^2$/g; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™233, and Hi-Sil™190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 m$^2$/g. Useful ranges of surface area include from about 32 to about 400 m$^2$/g, about 100 to about 250 m$^2$/g, and about 150 to about 220 m$^2$/g.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172, 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polydienes of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared in the substantial absence of coupling agents and shielding agents.

The rubber compositions prepared from the polydienes of this invention are particularly useful for forming tire components such as treads, subtreads, side walls, body ply skims, bead filler, and the like. In one or more embodiments, these tread or side wall formulations may include from about 10% to about 100% by weight, in other embodiments from about 35% to about 90% by weight, and in other embodiments from about 50% to about 80% by weight of the polydiene based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities ($ML_{1+4}$) of the polymer samples were determined at 100° C. by using a Monsanto Mooney viscometer with a large rotor, a one-minute warm-up time, and a four-minute running time. The number average ($M_n$) and weight average ($M_w$) molecular weights and molecular weight distributions ($M_w/M_n$) of the polymer samples were determined by gel permeation chromatography (GPC) calibrated with polystyrene standards and Mark-Houwink constants for the polymers in question. The cis-1,4-linkage, trans-1,4-linkage, and 1,2-linkage contents of the polymer samples were determined by Infrared spectroscopy.

Preparation of Preformed Catalyst

To a 200 mL dry bottle purged with nitrogen was add 4.3 mL of 22.0% butadiene solution in hexane, 8.5 mL of hexane, 8.5 mL of 1.45 M methylaluminoxane (MAO) solution in toluene, 0.23 mL of 0.537 M neodymium versatate (NdV) followed by 2.4 mL of 1.07 M diisobutylaluminium hydride (OIBA) in hexane. The mixture was aged for 2 minutes at room temperature and called Catalyst Component A. Then the designed amounts (Table 1) of the mixture were used in Examples 1-2. To the rest of the catalyst component A was added 0.16 mL of 0.537M bis(2-methoxyethyl)amine (BMEA). The mixture was aged at room temperature for 2 minutes and called Catalyst Component B. Then the designed amounts (Table 1) of the mixture were used in Examples 3-5.

Examples 1-2

Comparative Experiments

To dry bottles purged with nitrogen was added hexane and 1,3-butadiene (Bd) blend in hexane, resulting in a 330 g of 12.5% Bd solution in hexane. To the solution was charged with 4.0 mL of Catalyst Component A followed by 0.58 mL and 0.77 mL of 0.107 M diethylaluminium chloride (DEAC), respectively. The bottles were placed in a 65° C. water-bath for one hour. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 1.

Examples 3-5

To dry bottles purged with nitrogen was added hexane and 1,3-butadiene (Bd) blend in hexane, resulting in a 330 g of 12.5% Bd solution in hexane. To the solution was charged with 4.0 mL of Catalyst Component B followed by 0.39 mL, 0.48 mL and 0.58 mL of 0.107 M diethylaluminium chloride (DEAC), respectively. The bottles were placed in a 65° C. water-bath for one hours. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 1.

TABLE 1

|  | Sample | | | | |
| --- | --- | --- | --- | --- | --- |
|  | 1 | 2 | 3 | 4 | 5 |
| BMEA:Nd | 0.0 | 0.0 | 1.0 | 1.0 | 1.0 |
| Cl:Nd | 3.0 | 4.0 | 2.0 | 2.5 | 3.0 |
| Conversion (%) | 95.9 | 93.2 | 96 | 99 | 94.5 |
| ML1 + 4@100° C. | 34.0 | 28.9 | 34.8 | 34.5 | 31.2 |
| T80 | 1.76 | 1.63 | 1.59 | 1.58 | 1.51 |
| Mn | 136,002 | 132,172 | 132,947 | 133,626 | 127,500 |
| Mw | 228,048 | 225,221 | 237,732 | 225,610 | 217,158 |
| Mp | 168,139 | 164,543 | 187,023 | 192,696 | 192,372 |
| Mw/Mn | 1.6768 | 1.7040 | 1.7882 | 1.6884 | 1.7032 |
| Cis = 1,4 (%) | 91.37 | 92.08 | 92.17 | 93.64 | 94.43 |
| Trans-1,4 (%) | 8.02 | 7.3 | 7.27 | 5.82 | 5.02 |
| Vinyl (%) | 0.61 | 0.62 | 0.56 | 0.54 | 0.54 |

Preparation of Partially Preformed Catalyst for Examples 6-15

To a 200 mL dry bottle purged with nitrogen was add 5.6 mL of 21.5% butadiene solution in hexane, 9.5 mL of toluene, 4.4 mL of 4.75 M methylaluminoxane (MAO) solution in toluene, 0.49 mL of 0.537 M neodymium versatate (NdV) followed by 5.2 mL of 1.07 M diisobutylaluminium hydride (DIBA) in hexane. The mixture was aged for 2 minutes at room temperature and called Catalyst Component C. Then the designed amounts (Table 2) of the mixture were used in Examples 6 and 11. To the rest of the catalyst component A was added 0.41 mL of 0.537M Bis(2-methoxyethyl)amine (BMEA). The mixture was aged at room temperature for 2 minutes and called Catalyst Component D. Then the designed amounts (Table 2) of the mixture were used in Examples 7-10 and 12-15.

Example 6

Comparative Experiment

To dry bottles purged with nitrogen was added hexane and 1,3-butadiene (Bd) blend in hexane, resulting in a 330 g of 15.0% Bd solution in hexane. To the solution was charged with 2.11 mL of Catalyst Component C followed by 0.58 mL and 0.81 mL of 0.107 M diethylaluminium chloride (DEAC). The bottles were placed in a 50° C. water-bath for one hour. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 2.

Examples 7-10

To dry bottles purged with nitrogen was added hexane and 1,3-butadiene (Bd) blend in hexane, resulting in a 330 g of 15.0% Bd solution in hexane. To the solution was charged with 2.15 mL of Catalyst Component D followed by 0.41 mL, 0.51 mL, 0.61 mL and 0.71 mL of 0.107 M diethylaluminium chloride (DEAC), respectively. The bottles were placed in a 50° C. water-bath for one hour. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 2.

Example 11

Comparative Experiment

The experiment was the same as Example 6 except that polymerization was run in a 65° C. water-bath for one hour. The polybutadiene was then dried in a drum-dryer at 120° C. and properties were listed in Table 2.

Example 12-15

The experiments were the same as Examples 7-10 except that polymerizations were run in a 65° C. water-bath for one hour. The polybutadiene was then dried in a drum-dryer at 120° C. and properties were listed in Table 3.

TABLE 2

| | Example # | | | | |
|---|---|---|---|---|---|
| | 6 | 7 | 8 | 9 | 10 |
| Ligands | NA | BMEA | BMEA | BMEA | BMEA |
| L:Nd | 0.0 | 1.0 | 1.0 | 1.0 | 1.0 |
| DEAC:Nd | 4.0 | 2.0 | 2.5 | 3.0 | 3.5 |
| Conversion, % | 98.2% | 97.8% | 96.4% | 95.6% | 92.1% |
| ML1 + 4 @ 100° C. | 29.50 | 49.70 | 48.80 | 48.50 | 46.90 |
| T80, s | 1.44 | 1.75 | 1.72 | 1.71 | 1.69 |
| Mn | 125,900 | 145,448 | 142,788 | 141,672 | 138,671 |
| Mw | 204,868 | 249,040 | 248,035 | 252,945 | 249,381 |
| Mp | 164,785 | 191,436 | 190,747 | 193,266 | 195,653 |
| Mw/Mn | 1.63 | 1.71 | 1.74 | 1.79 | 1.80 |
| cis-1,4; % | 94.09% | 93.55% | 95.23% | 95.99% | 96.71% |
| trans-1,4; % | 5.25% | 5.90% | 4.24% | 3.50% | 2.82% |
| Vinyl, % | 0.66% | 0.55% | 0.53% | 0.51% | 0.48% |

Preparation of Partially Preformed Catalyst for Examples 16-20

To a 200 mL dry bottle purged with nitrogen was add 2.8 mL of 21.5% butadiene solution in hexane, 4.8 mL of toluene, 2.2 mL of 4.75 M methylaluminoxane (MAO) solution in toluene, 0.24 mL of 0.537 M neodymium versatate (NdV) followed by 2.6 mL of 1.07 M diisobutylaluminium hydride (DIBA) in hexane. The mixture was aged for 2 minutes at room temperature and 0.24 mL of 0.537M (2-methoxyethyl)-methylamine (MEMA) was added. The mixture was aged at room temperature for 2 minutes and called Catalyst Component E. Then the designed amounts (Table 3) of the mixture were used in experiments 16-20.

Examples 16-20

To dry bottles purged with nitrogen was added hexane and 1,3-butadiene (Bd) blend in hexane, resulting in a 330 g of 15.0% Bd solution in hexane. To the solution was charged with 2.15 mL of Catalyst Component E followed by 0.41 mL, 0.51 mL, 0.61 mL, 0.71 mL and 0.81 mL of 0.107 M diethylaluminium chloride (DEAC), respectively. The bottles were placed in a 65° C. water-bath for one hour. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 3.

TABLE 3

| | Example # | | | | |
|---|---|---|---|---|---|
| | 11 | 12 | 13 | 14 | 15 |
| Ligands | NA | BMEA | BMEA | BMEA | BMEA |
| L:Nd | 0.0 | 1.0 | 1.0 | 1.0 | 1.0 |
| DEAC:Nd | 4.0 | 2.0 | 2.5 | 3.0 | 3.5 |
| Conversion, % | 98.6% | 99.0% | 98.6% | 98.2% | 97.4% |
| ML1 + 4 @ 100° C. | 27.50 | 41.60 | 40.20 | 39.50 | 39.80 |
| T80, s | 1.60 | 1.92 | 1.81 | 1.78 | 1.77 |
| Mn | 116,605 | 131,768 | 130,923 | 128,132 | 127,256 |
| Mw | 202,941 | 234,580 | 237,208 | 233,172 | 240,530 |
| Mp | 159,534 | 176,732 | 179,765 | 180,748 | 186,315 |
| Mw/Mn | 1.74 | 1.78 | 1.81 | 1.82 | 1.89 |
| cis-1,4; % | 93.19% | 92.97% | 94.59% | 95.30% | 95.94% |
| trans-1,4; % | 6.06% | 6.36% | 4.73% | 4.03% | 3.40% |
| Vinyl, % | 0.75% | 0.68% | 0.67% | 0.67% | 0.66% |

| | Example # | | | | |
|---|---|---|---|---|---|
| | 16 | 17 | 18 | 19 | 20 |
| Ligands | MEMA | MEMA | MEMA | MEMA | MEMA |
| L:Nd | 1.0 | 1.0 | 1.0 | 1.0 | 1.0 |
| DEAC:Nd | 2.0 | 2.5 | 3.0 | 3.5 | 4.0 |
| Conversion, % | 98.8% | 98.8% | 98.2% | 98.2% | 98.2% |
| ML1 + 4 @ 100° C. | 36.90 | 35.80 | 35.90 | 35.00 | 35.90 |
| T80, s | 1.86 | 1.79 | 1.86 | 1.86 | 1.78 |
| Mn | 127,300 | 126,180 | 124,489 | 123,413 | 122,121 |
| Mw | 220,476 | 220,568 | 223,063 | 222,156 | 227,705 |
| Mp | 172,546 | 171,957 | 174,795 | 174,916 | 183,114 |
| Mw/Mn | 1.73 | 1.75 | 1.79 | 1.80 | 1.86 |
| cis-1,4; % | 91.07% | 93.36% | 94.40% | 94.94% | 95.61% |
| trans-1,4; % | 8.36% | 6.08% | 5.04% | 4.50% | 3.89% |
| Vinyl, % | 0.57% | 0.56% | 0.56% | 0.55% | 0.51% |

Preparation of Preformed Catalyst for Examples 21-22

To 200 mL dry bottles purged with nitrogen were add 1.4 mL of 21.1% butadiene solution in hexane, 2.4 mL of toluene, 1.1 mL of 4.75 M methylaluminoxane (MAO) solution in toluene, 0.12 mL of 0.537 M neodymium versatate (NdV) followed by 1.3 mL of 1.07 M diisobutylaluminium hydride (DIBA) in hexane. The mixture was aged for 2 minutes at room temperature and 0.18 mL and 0.24 mL of 1.07 M diethylaluminium chloride (DEAC) were added, respectively. The mixtures were aged for 15 min at room temperature and called catalyst F and G. Then the designed amounts (Table 4) of the mixture were used in experiments 21-22.

Examples 21-22

Comparative Experiments

To dry bottles purged with nitrogen was added hexane and 1,3-butadiene (Bd) blend in hexane, resulting in a 330 g of 15.0% Bd solution in hexane. To the solution was charged with 2.13 mL of performed catalyst F and G, respectively. The bottles were placed in a 65° C. water-bath for one hour. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 4.

Preparation of Preformed Catalyst for Examples 23-26

To 200 mL dry bottles purged with nitrogen were add 1.4 mL of 21.1% butadiene solution in hexane, 2.4 mL of toluene, 1.1 mL of 4.75 M methylaluminoxane (MAO) solution in toluene, 0.12 mL of 0.537 M neodymium versatate (NdV) followed by 1.3 mL of 1.07 M diisobutylaluminium hydride (DIBA) in hexane. The mixture was aged for 2 minutes at room temperature and 0.12 mL of 0.537M Bis(2-methoxyethyl)amine (BMEA) was added. The mixture was aged at room temperature for 2 minutes and 0.15 mL, 0.18 mL, 0.21 mL and 0.24 mL of 1.07M diethylaluminium chloride (DEAC) were added, respectively. The mixtures were aged for 15 min at room temperature and called catalyst H, I, J, and K. Then the designed amounts (Table 4) of the mixture were used in experiments 23-26.

Examples 23-26

To dry bottles purged with nitrogen was added hexane and 1,3-butadiene (Bd) blend in hexane, resulting in a 330 g of 15.0% Bd solution in hexane. To the solution was charged with 2.13 mL of performed catalyst H, I, J, and K, respectively. The bottles were placed in a 65° C. water-bath for one hour. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 4.

Preparation of Preformed Catalyst for Examples 27-30

To 200 mL dry bottles purged with nitrogen were add 1.4 mL of 21.1% butadiene solution in hexane, 2.4 mL of toluene, 1.1 mL of 4.75 M methylaluminoxane (MAO) solution in toluene, 0.12 mL of 0.537 M neodymium versatate (NdV) followed by 1.3 mL of 1.07 M diisobutylaluminium hydride (DIBA) in hexane. The mixture was aged for 2 minutes at room temperature and 0.12 mL of 0.537M (2-methoxyethyl)-methylamine (MEMA) was added. The mixture was aged at room temperature for 2 minutes and 0.18 mL and 0.24 mL of 1.07 M diethylaluminium chloride (DEAC) were added, respectively. The mixtures were aged for 15 min at room temperature and called catalyst L, M, N, and O. Then the designed amounts of the mixture were used in experiments 27-30.

Examples 27-30

To dry bottles purged with nitrogen was added hexane and 1,3-butadiene (Bd) blend in hexane, resulting in a 330 g of 15.0% Bd solution in hexane. To the solution was charged with 2.13 mL of performed catalyst L, M, N, and O, respectively. The bottles were placed in a 65° C. water-bath for one hour. Then the reaction mixtures were treated with isopropanol containing 2,5-di-tert-butyl-4-methylphenol (BHT) in order to deactivate the catalyst, coagulate and stabilize the polymers. The polybutadiene was then dried in a drum-dryer at 120° C. and properties were listed in Table 4.

TABLE 4

|  | Example # | | | | |
|---|---|---|---|---|---|
|  | 21 | 22 | 23 | 24 | 25 |
| Ligands | None | None | BMEA | BMEA | BMEA |
| L:Nd | 0.0 | 0.0 | 1.0 | 1.0 | 1.0 |
| DEAC:Nd | 3.0 | 4.0 | 2.5 | 3.0 | 3.5 |
| Conversion, % | 100.0% | 100.0% | 100.0% | 100.0% | 100.0% |
| ML1 + 4 @ 100° C. | 36.40 | 32.00 | 36.90 | 35.90 | 32.70 |
| T80, s | 1.81 | 1.73 | 1.80 | 1.76 | 1.70 |
| Mn | 124,327 | 120,961 | 125,783 | 122,822 | 118,588 |
| Mw | 226,444 | 216,571 | 227,566 | 225,584 | 222,510 |
| Mp | 168,325 | 162,251 | 172,677 | 174,618 | 173,275 |
| Mw/Mn | 1.82 | 1.79 | 1.81 | 1.84 | 1.88 |
| cis-1,4; % | 93.88% | 94.35% | 95.05% | 95.51% | 96.08% |
| trans-1,4; % | 5.48% | 5.02% | 4.37% | 3.91% | 3.34% |
| Vinyl, % | 0.64% | 0.63% | 0.58% | 0.59% | 0.58% |
|  | Example # | | | | |
|  | 26 | 27 | 28 | 29 | 30 |
| Ligands | BMEA | MEMA | MEMA | MEMA | MEMA |
| L:Nd | 1.0 | 1.0 | 1.0 | 1.0 | 1.0 |
| DEAC:Nd | 4.0 | 2.5 | 3.0 | 3.5 | 4.0 |
| Conversion, % | 100.0% | 100.0% | 100.0% | 100.0% | 100.0% |
| ML1 + 4 @ 100° C. | 34.90 | 26.50 | 32.80 | 32.70 | 32.00 |
| T80, s | 1.74 | 1.60 | 1.71 | 1.72 | 1.73 |
| Mn | 120,314 | 113,843 | 121,222 | 112,913 | 113,365 |
| Mw | 227,372 | 199,167 | 217,055 | 216,982 | 222,317 |
| Mp | 179,169 | 156,827 | 170,573 | 171,849 | 179,953 |
| Mw/Mn | 1.89 | 1.75 | 1.79 | 1.92 | 1.96 |
| cis-1,4; % | 96.33% | 93.63% | 95.11% | 95.70% | 96.66% |
| trans-1,4; % | 3.11% | 5.78% | 4.31% | 3.73% | 2.80% |
| Vinyl, % | 0.56% | 0.60% | 0.58% | 0.57% | 0.54% |

Various modifications and alterations that do not depart from the scope and spirit of this invention will become apparent to those skilled in the art. This invention is not to be duly limited to the illustrative embodiments set forth herein.

What is claimed is:

1. A process for preparing a polydiene, the process comprising the step of: polymerizing conjugated diene monomer in the presence of a (hydrocarbyloxyhydrocarbyl) amine, where said step of polymerizing employs a lanthanide-based catalyst system.

2. The process of claim 1, where the (hydrocarbyloxyhydrocarbyl) amine is defined by the formula

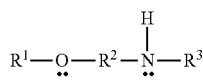

where $R^1$ is a hydrocarbyl group, $R^2$ is a hydrocarbylene group, and $R^3$ is a hydrocarbyl group or a group defined by the formula $R^1$—O—$R^2$—, where $R^1$ and $R^2$ are defined above.

3. A process for preparing a polydiene, the process comprising the step of: polymerizing conjugated diene monomer with a lanthanide-based catalyst system including the combination of or reaction product of (a) a lanthanide compound, (b) an alkylating agent, (c) a halogen-containing compound, and (d) a (hydrocarbyloxyhydrocarbyl)amine.

4. The process of claim 3, where the (hydrocarbyloxyhydrocarbyl) amine is defined by the formula

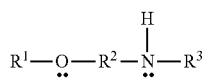

where $R^1$ is a hydrocarbyl group, $R^2$ is a hydrocarbylene group, and $R^3$ is a hydrocarbyl group including a group defined by the formula $R^1$—O—$R^2$—, where $R^1$ and $R^2$ are defined above.

5. The process of claim 3, where the (hydrocarbyloxyhydrocarbyl) amine is defined by the formula

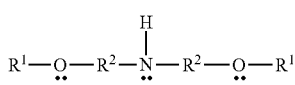

where each $R^1$ is a monovalent organic group and each $R^2$ is a divalent organic group.

6. The process of claim 3, where said step of polymerizing takes place within a polymerization mixture that includes at least 20% by weight of solvent based upon the total weight of the polymerization mixture.

7. The process of claim 6, where said solvent includes an aliphatic solvent.

8. The process of claim 3, where said step of polymerizing takes place within a polymerization mixture that includes less than 20% by weight of solvent based on the total weight of the polymerization mixture.

9. The process of claim 8, where said step of polymerizing takes place within a polymerization mixture that is substantially devoid of solvent.

10. The process of claim 3, where the molar ratio of the (hydrocarbyloxyhydrocarbyl)amine to the lanthanide compound is from about 0.1:1 to about 500:1.

11. The process of claim 3, where the molar ratio of the (hydrocarbyloxyhydrocarbyl)amine to the lanthanide compound is from about 0.5:1 to about 200:1.

12. The process of claim 3, where the molar ratio of the (hydrocarbyloxyhydrocarbyl)amine to the lanthanide compound is from about 1:1 to about 100:1.

13. The process of claim 1, where the (hydrocarbyloxyhydrocarbyl) amine includes bis(hydrocarbyloxyhydrocarbyl) amines or (hydrocarbyloxyhydrocarbyl)(hydrocarbyl) amines.

14. The process of claim 13, where the bis(hydrocarbyloxyhydrocarbyl)amines include bis(alkoxyalkyl)amines, bis(aryloxyalkyl)amines, or (alkoxyalkyl)(aryloxyalkyl) amines.

15. The process of claim 13, where the (hydrocarbyloxyhydrocarbyl)(hydrocarbyl)amines include (alkoxyalkyl)(alkyl)amines, (alkoxyalkyl)(aryl)amines, (aryloxyalkyl)(alkyl)amines, or (aryloxyalkyl)(aryl)amines.

16. The process of claim 14, where the bis(alkoxyalkyl) amines are selected from the group consisting of bis(methoxymethyl)amine, bis(ethoxymethyl)amine, bis(propoxymethyl)amine, bis(butoxymethyl)amine, bis(pentoxymethyl) amine, bis(2-methoxyethyl)amine, bis(1-ethoxyethyl)amine, bis(2-propoxyethyl)amine, bis(1-butoxyethyl)amine, bis(2-pentoxyethyl)amine bis(1-methoxypropyl)amine, bis(2-ethoxypropyl)amine, bis(3-propoxypropyl)amine, bis(1-butoxypropyl)amine, bis(2-pentoxypropyl)amine, bis(1-methoxybutyl)amine, bis(2-ethoxybutyl)amine, bis(3-propoxybutyl)amine, bis(4-butoxybutyl)amine, and bis(1-pentoxybutyl)amine.

17. The process of claim 14, where the bis(aryloxyalkyl) amines are selected from the group consisting of bis(phenoxymethyl)amine, bis(2-phenoxyethyl)amines bis(3-phenoxypropyl)amine, bis(4-phenoxybutyl)amine and bis(5-phenoxypentyl)amine.

18. The process of claim 15, where the (alkoxyalkyl)(alkyl) amines are selected from the group consisting of (methoxymethyl)(methyl)amine, (ethoxymethyl)(methyl)amine, (propoxymethyl)(methyl)amine, (butoxymethyl)(methyl)amine, (pentoxymethyl)(methyl)amine, (1-methoxyethyl)(ethyl) amine, (2-ethoxyethyl)(ethyl)amine, (1-propoxyethyl) (ethyl)amine, (2-butoxyethyl)(ethyl)amine, (1-pentoxyethyl) (ethyl)amine, (1-methoxypropyl)(propyl)amine, (2-ethoxypropyl)(propyl)amine, (3-propoxypropyl)(propyl) amine, (1-butoxypropyl)(propyl)amine, (2-pentoxypropyl) (propyl)amine, (1-methoxybutyl)(butyl)amine, (2-ethoxybutyl)(butyl)amine, (3-propoxybutyl)amine, (4-butoxybutyl) (butyl)amine, and (1-pentoxybutyl)(butyl)amine.

19. The process of claim 15, where the (alkoxyalkyl)(aryl) amines are selected from the group consisting of (methoxymethyl)(phenyl)amine, (ethoxymethyl)(phenyl)amine, (propoxymethyl)(phenyl)amine, (butoxymethyl)(phenyl)amine, and (pentoxymethyl)(phenyl)amine.

20. The process of claim 15, where the (aryloxyalkyl) (alkyl)amines are selected from the group consisting of (phenoxymethyl)(methyl)amine, (2-phenoxyethyl)(methyl) amine, (3-phenoxypropyl)(methyl)amine, (4-phenoxybutyl) (methyl)amine, (5-phenoxypentyl)(methyl)amine, (4-phenoxymethyl)(ethyl)amine, (2-phenoxyethyl)(ethyl) amine, (1-phenoxypropyl)(ethyl)amine, (2-phenoxybutyl) (ethyl)amine, (5-phenoxypentyl)(ethyl)amine, (phenoxymethyl)(propyl)amine, (2-phenoxyethyl)(propyl)amine, (3-phenoxypropyl)(propyl)amine, (4-phenoxybutyl)(propyl) amine, and (5-phenoxypentyl)(propyl)amine.

21. The process of claim 15, where the (aryloxyalkyl)(aryl) amines are selected from the group consisting of (phenoxymethyl)(phenyl)amine, (2-phenoxyethyl)(phenyl)amine, (3-phenoxypropyl)(phenyl)amine, (4-phenoxybutyl)(phenyl)amine, and (5-phenoxypentyl)(phenyl)amine.

22. A process for preparing a polydiene, the process comprising the step of: introducing (a) conjugated diene monomer, (b) a lanthanide compound, (c) an alkylating agent, (d) a halogen-containing compound, and (e) a (hydrocarbyloxyhydrocarbyl)amine.

23. The process of claim 22, where said step of introducing forms a polymerization mixture that includes less than 20% by weight of solvent based on the total weight of the polymerization mixture.

24. The process of claim 22, where said step of introducing forms a polymerization mixture that is substantially devoid of solvent.

* * * * *